United States Patent
Köhrer

(10) Patent No.: US 11,998,416 B2
(45) Date of Patent: Jun. 4, 2024

(54) DENTAL INSTRUMENT FOR REMOVING FRACTURED ROOT CANAL INSTRUMENTS

(71) Applicant: Dennis Manuel Köhrer, Neuss (DE)

(72) Inventor: Dennis Manuel Köhrer, Neuss (DE)

( * ) Notice: Subject to any disclaimer, the term of this patent is extended or adjusted under 35 U.S.C. 154(b) by 594 days.

(21) Appl. No.: 17/117,506

(22) Filed: Dec. 10, 2020

(65) Prior Publication Data
US 2021/0161619 A1 Jun. 3, 2021

Related U.S. Application Data

(63) Continuation-in-part of application No. PCT/EP2019/063073, filed on May 21, 2019.

(51) Int. Cl.
*A61C 5/46* (2017.01)

(52) U.S. Cl.
CPC ........................ *A61C 5/46* (2017.02)

(58) Field of Classification Search
CPC .. A61C 5/46; A61C 3/14; A61C 3/168; A61C 9/0033
See application file for complete search history.

(56) References Cited

U.S. PATENT DOCUMENTS

| | | | | |
|---|---|---|---|---|
| 3,703,767 | A | * 11/1972 | Masseran | A61C 5/46 433/161 |
| 7,080,981 | B2 | 7/2006 | Terauchi | |
| 2020/0113648 | A1 * | 4/2020 | Pawlowski | A61C 5/46 |

FOREIGN PATENT DOCUMENTS

| | | |
|---|---|---|
| CN | 106580487 A | 4/2017 |
| GB | 2557162 * | 6/2018 |
| JP | 2004024621 A | 1/2004 |

OTHER PUBLICATIONS

Machine Translation of CN106580487 A. Accessed via Google Patents on Oct. 4, 2023 (Year: 2017).*

* cited by examiner

*Primary Examiner* — Edward Moran
(74) *Attorney, Agent, or Firm* — Calderon, Safran & Wright P.C.

(57) ABSTRACT

An instrument for removing fractured root canal instruments, comprising an instrument housing formed hollow at least at its front end portion, a slide which is non-rotatably held on the instrument housing but guided for translational movement in an axial direction, a threaded rod which is fixed to the slide and is engaged with a counter thread of the instrument housing or a counter member held on the instrument housing, so that a relative rotational movement between the threaded rod on the one hand and the instrument housing and/or the counter member on the other hand results in an axial displacement of the slide, and fastening means for fastening a wire to the slide, wherein the hollow instrument housing is open towards its front side, so that a wire can be guided through the open front side into the instrument housing and therein to the fastening means.

11 Claims, 14 Drawing Sheets

A - A (2:1)

DENTAL INSTRUMENT FOR REMOVING FRACTURED ROOT CANAL INSTRUMENTS

CROSS-REFERENCE TO RELATED APPLICATIONS AND CLAIM TO PRIORITY

This application is a by-pass continuation in part application of International Application No. PCT/EP2019/063073 filed May 21, 2019, which claims priority to German Patent Application Nos. 102018004714.9 filed Jun. 10, 2018 and 202018105044.3 filed Sep. 4, 2018, the disclosures of which are incorporated herein by reference and to which priority is claimed.

FIELD OF THE INVENTION

The invention relates to a dental instrument for removing fractured root canal instruments from root canals or the surrounding tissue of the teeth (bone and soft tissue).

The invention further relates to an attachment for an instrument for removing fractured root canal instruments.

BACKGROUND OF THE INVENTION

The fracture of instruments for the preparation of root canals is a not uncommon complication in the daily practice of the dentist. A fractured instrument usually blocks the root canal to be treated and thus prevents further preparation, cleaning and tight filling, which must be considered a risk to the success of the treatment. In not uncommon cases this means extraction of the tooth. The removal of these fractured instrument is a great challenge for the dentist and is very difficult in most cases. The instruments and systems available for the removal of fractured instruments often only allow the removal of instruments that have broken off in the coronal third of the root canal. For most techniques, a relatively large access to salvage the instrument must be created, which entails a high risk of root perforation and generally weakens the tooth very much.

The loop technique using a very thin wire, which is passed through a blunt cannula at both ends and thus forms a loop at the front of the cannula with which the fractured piece of the instrument can be grasped, was already described in literature and US-patent in the 98s (Roig-Greene J L. The retrieval of foreign objects from root canals: a simple add. J Endod 1983; 9:394-397, U.S. Pat. No. 4,247,285 A). This technique allows the fractured instrument to be grasped and removed even deep inside the root canal. The wire ends at the top of the cannula are grasped here with an artery clamp or pliers and the wire is tightened by twisting it open so that the loop at the other end of the cannula closes. This technique proves to be very difficult and technically sensitive in practical implementation, as the handling is very impractical. It is very difficult to hold the cannula (only with the fingertips) and therefore it is difficult to place the loop around the instrument to be removed. Tensioning the wire with the pliers causes movements that make it difficult to place the loop accurately while the loop is being tightened.

From DE 10 2013 003 483 A1, an instrument for the removal of fractured instruments, that is also based on the loop technique, is known. Here, a spring tensioning device is used to tighten the loop abruptly by means of a trigger. Disadvantage of this technique is the lack of control over the loop tension and the closing force of the loop caused by the elasticity of the spring. If the spring is pulled harder, it yields, the loop opens slightly and the instrument slips out of the loop. Only loose instruments can be removed. Another instrument based on the loop technique is known as the "Fragremover" (Hergt, Ansgar, Petschler, Michael 2018 "Fragment removal with the Fragremover" Endodontie 27 2018 Nr. 1 02.03.20.18 Quintessenz Verlag). Although this instrument allows the loop to be tensioned continuously with the help of a union nut, which tensions the wire when turned, its size and shape (pistol shape) are disadvantageous in handling. The instrument is made of plastic for weight reasons. Therefore, the mechanism is quite stiff and has to be operated unergonomically with the fingers, which again can lead to relatively strong shaking movements, making it difficult to place the loop. The size of the instrument is an obstacle in the very narrow working field of the oral cavity and can prevent the view through the microscope.

Another instrument based on the loop technique is the "Loop Device" from the Terauchi File Retrieval Kit (U.S. Pat. No. 7,080,981 B2). This instrument is more handy, but here the practitioner has to operate a sliding knob with the index finger to close the loop. Here too, undesired movement makes placement more difficult and the force of the loop closure is not very secure. The biggest disadvantage of the instrument is that it is only used once. The high application costs of 135 USD per instrument and the risk that several loops may break during one treatment, making it difficult to predict the treatment costs, mean that the instrument is used very rarely in practice.

SUMMARY OF THE INVENTION

The purpose of the invention is to establish the loop technique with a practicable instrument in accordance with the invention that is applicable in everyday practice, safe and economically feasible, and thus to provide the dentist with a tool that enables him to safely remove fractured instruments from root canals in order to preserve otherwise unpreservable teeth.

To solve this task, the invention suggests a dental instrument for removing fractured root canal instruments, comprising an instrument housing formed hollow at least at its front end portion, a slide which is non-rotatably held on the instrument housing but guided for translational movement in an axial direction, a threaded rod which is fixed to the slide and is engaged with a counter thread of the instrument housing or a counter member held on the instrument housing, so that a relative rotational movement between the threaded rod on the one hand and the instrument housing and/or the counter member on the other hand results in an axial displacement of the slide, and fastening means for fastening a wire to the slide, wherein the hollow instrument housing is open towards its front side, so that a wire can be guided through the open front side into the instrument housing and therein to the fastening means.

The invention is based on the consideration of still using the loop technique for file removal, as this is still the most promising solution, but to tension the wire and thus to terminate the loop by means of a slide which is precisely and continuously axially adjustable by a relative rotational movement between the threaded rod on the one hand and the instrument housing and/or a counter member held thereon on the other hand. The relative rotational movement does not have to be performed by the dentist himself, but can be rotated by the assistant after the loop has been placed around the fractured instrument to be removed in order to prevent breaking when the loop is closed.

Fastening means are provided to fix the wire to the slide, which can be operated from the outside of the instrument. According to a preferred embodiment, the instrument housing has a windowing laterally so that a wire inserted into the instrument housing through the open front side thereof can be guided outwardly through the windowing again and brought into engagement with the fastening means.

In a further embodiment of the invention, the instrument housing can be tubular, in which case the slide is non-rotatably held in the instrument housing but is guided for translational movement in the axial direction. In this case, the fastening means are preferably connected to the slide through the windowing of the instrument housing and project from the instrument housing so that they can be actuated from the outside of the instrument housing.

In a preferred embodiment of the invention, it is provided that the fastening means comprise a threaded bolt, which is inserted into the slide through the windowing and is fixed, in particular screwed tight, therein, and a locking nut, which is screwed onto the end of the threaded bolt projecting from the slide, the arrangement being such that a wire can be clamped between the locking nut and the slide to fix it to the slide.

Thereby, an axial through-hole can be formed in the threaded bolt or an annular circumferential groove can be formed in the circumferential surface of the threaded bolt. In this configuration, the wire inserted into the instrument housing through its open front side can be positioned exactly on the threaded bolt via the through-hole or the circumferential groove or a corresponding recess and wound around the threaded bolt if necessary, before the wire is clamped by tightening the locking nut.

According to a preferred embodiment of the invention, it is provided that the front end of the instrument housing is designed on the outside as an instrument tip in such a way that an attachment in the form of a cannula can be plugged onto the instrument tip and fixed thereto in a clamping manner, for which purpose the instrument tip has a corresponding conicity on the outside, wherein a bore open towards the front of the instrument housing is formed in the instrument tip for the passage of a wire.

In particular, the instrument tip can be provided with a radially outwardly projecting, axially extending web, so that a cannula provided with a corresponding groove can be positioned on the instrument tip in the circumferential direction.

This embodiment is based on the consideration to provide an attachment for the instrument, which only needs to be pushed onto the instrument tip, so that time-consuming handling to insert the wire into the instrument housing while forming a loop is no longer necessary. Such an attachment comprises a cannula, which has a hollow needle or a hollow shaft and a fastening sleeve, which has a conicity on the inside, provided at an end face thereof for attachment to a syringe or fastening cone of the instrument, wherein the two ends of a wire are inserted into the hollow needle in such a way that a loop is formed at the front end of the hollow needle and the two wire ends project from the rear end of the cannula. The two wire ends can be fixed to a needle-like or a pin-like guide rod. With this attachment, the loop is already pre-assembled on the cannula so that the cannula only has to be placed on the instrument tip after the wire ends have been guided through the hole in the instrument tip into the instrument housing. If the two wire ends are attached to a guide pin, threading is particularly easy.

The adjusting mechanism for converting a rotational movement into an axial movement of the slide can be designed in different ways. According to one embodiment, it is provided that the threaded rod is connected to the slide in a rotationally fixed manner and engages axially into the instrument housing from the rear side thereof, and that an adjusting wheel is screwed onto an external thread of the threaded rod, said adjusting wheel being held axially fixed to the instrument housing, so that a rotation of the adjusting wheel is converted into an axial movement of the threaded rod and thus of the slide. A holder can be attached, in particular screwed tight, to the rear side of the instrument housing, through which holder the threaded rod passes axially and in which holder the adjusting wheel is positioned axially fixed. According to a particularly preferred embodiment, the adjusting wheel is axially supported on the holder by a sliding or a roller bearing so that it can be turned particularly easily.

According to an alternative embodiment, it may be provided that the threaded rod is held axially fixed to the slide but rotatable about its axis, and in particular engages axially into the instrument housing from the rear side thereof, and that an external thread of the threaded rod is in engagement with the corresponding counter thread of the instrument housing or of component fixed thereto, so that a rotation of the threaded rod is converted into an axial translational movement of the slide, an actuating wheel being provided in particular at the free end of the threaded rod.

The threaded rod is preferably provided with a fine thread having a pitch of 0.2-1.2 mm, in particular 0.4-1 mm, so that a very fine adjustment or movement of the slide is possible. In addition, means may be provided to detect a tensile force acting on a slide and thus measure the extraction forces when removing a root canal instrument.

In the following, the details, advantages and function of an instrument according to the invention is explained using the enclosed drawings. The numbers refer to the components numbered in the figures.

DETAILED DESCRIPTION OF THE PREFERRED EMBODIMENT(S)

Figure 1:
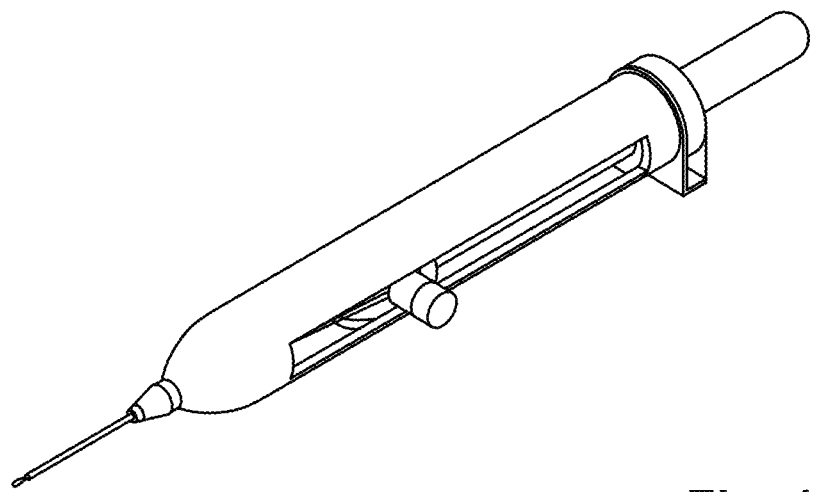
FIG. 1 to FIG. 5 show different perspective views of an instrument according to the invention provided with a loop arrangement, as it is shown in FIG. 18.
Figure 2:
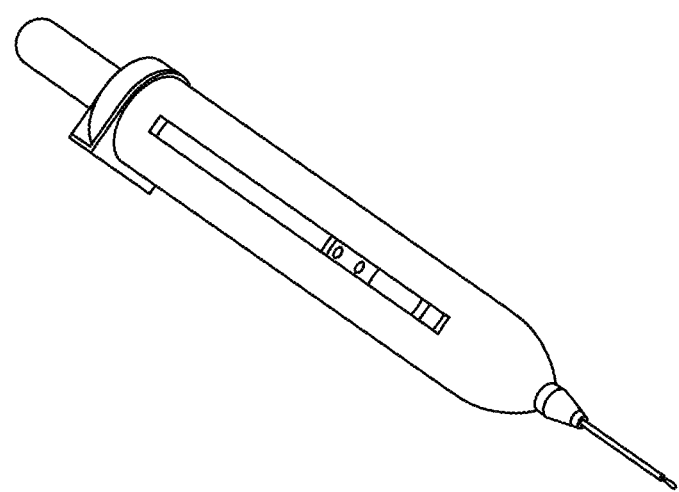
Figure 3:
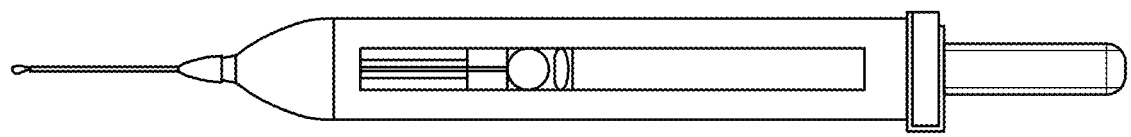
Figure 4:
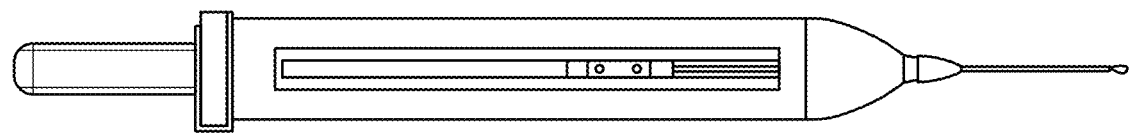
Figure 5:
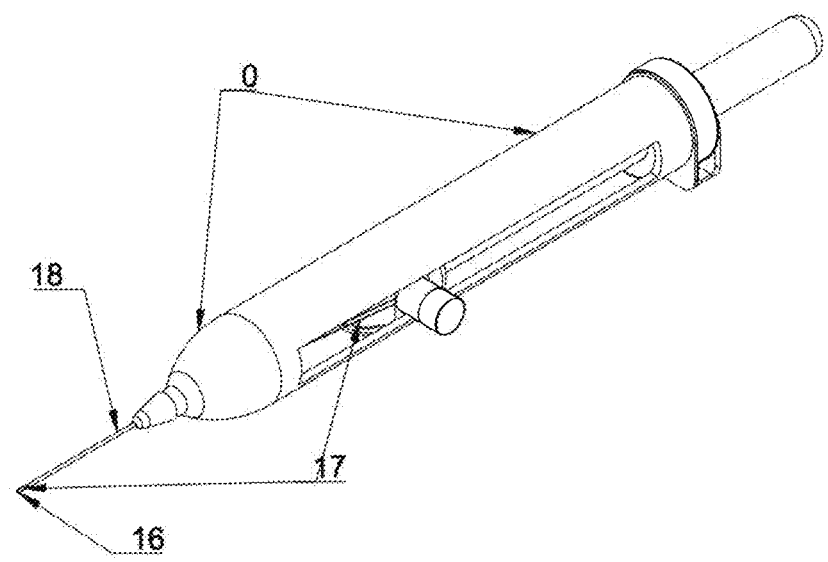

The tensioning of the wire 17 and thus the closing of the loop 16 is performed by a slide 7, which is moved precisely and continuously by means of a threaded rod 4 via an adjusting wheel 2 in the instrument housing 1. This means that the adjusting wheel 2 does not have to be operated by the dentist himself, but can be rotated by the assistant after the loop has been placed around the fractured instrument to be removed on the physician's order to prevent shaking when the loop is being closed.

Another aspect of the invention is that the instrument 0, which is preferably made of stainless steel or titanium, allows very fine and continuous adjustment by using a fine thread of the threaded rod 4 having a lifting of 0.4 mm-1 mm per rotation. Its handy size and the shape allow a safe and targeted handling during the high-precision and difficult placement of the loop.

Another feature according to the invention is the guiding of the slide 7 by the guide block 8 in the rail 11, which prevents a rotation of the slide and ensures precise guidance.

Figure 16:
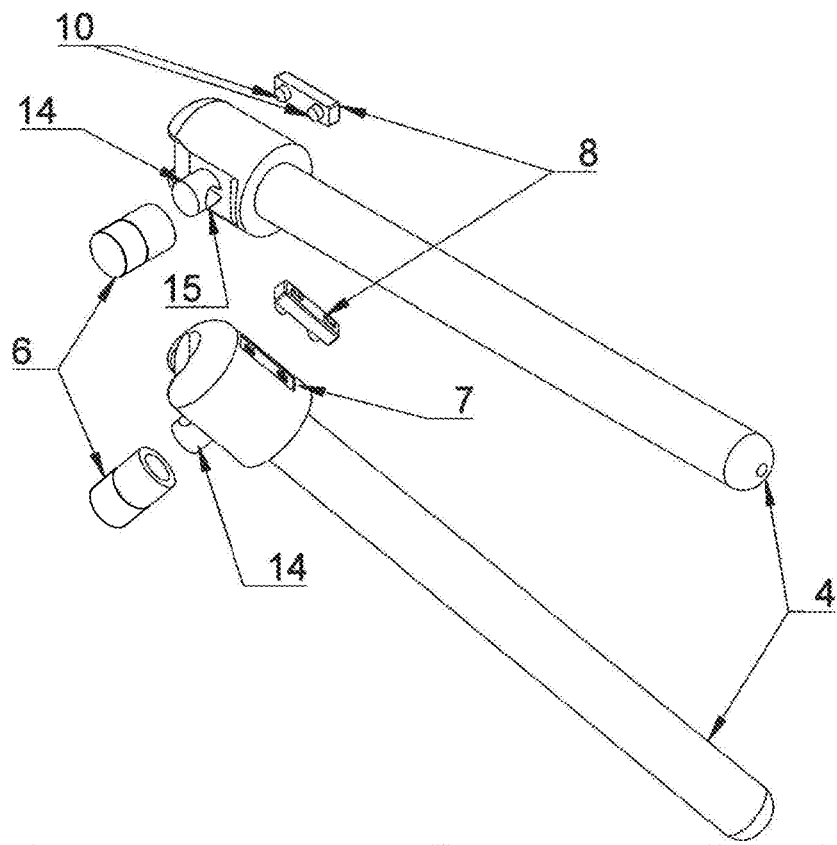
FIGS. 16a and 16b show the threaded rod with the slide 7 of FIG. 12 in perspective views.
Figure 17:
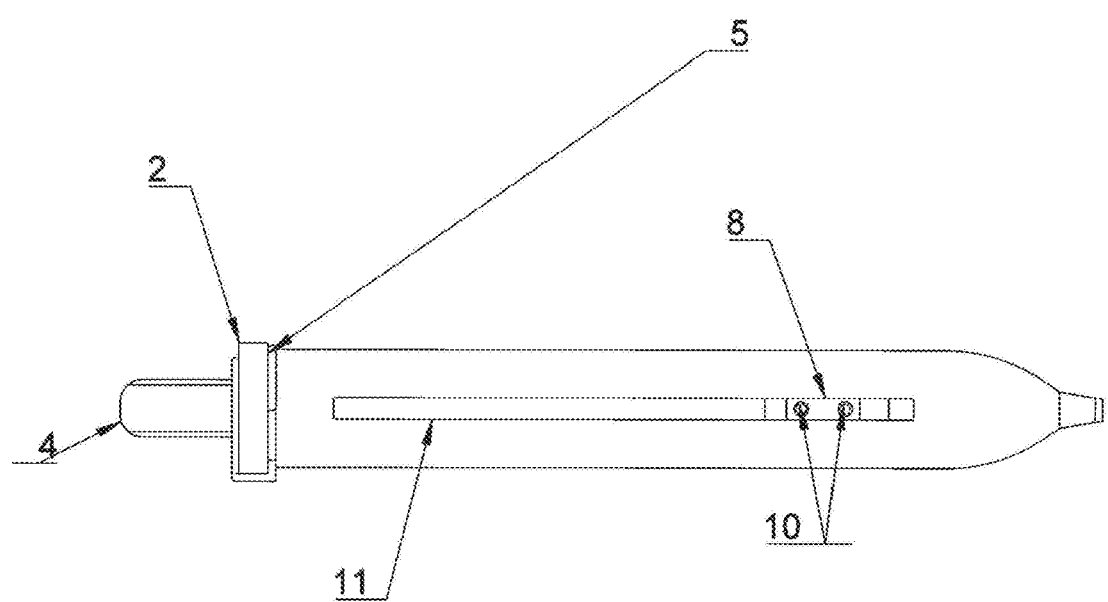
FIG. 17 shows the arrangement of FIG. 13 from the rear side thereof.

The possibility of using different attachments (FIG. 18) is essential for the invention. Thus, a large number of different attachment variants can be selected. Cannula length and cannula diameter 18 as well as wire diameter and wire material can be selected according to the individual case. Due to the low-cost attachments, the application is more economical in terms of material costs than with disposable instruments. The preparation of the instrument is not very time-consuming due to the easy exchange of the attachments, which is made possible by the quick fixation of the wire 17 with the aid of the locking nut 6 (FIG. 16 and FIG. 16).

Figure 18:
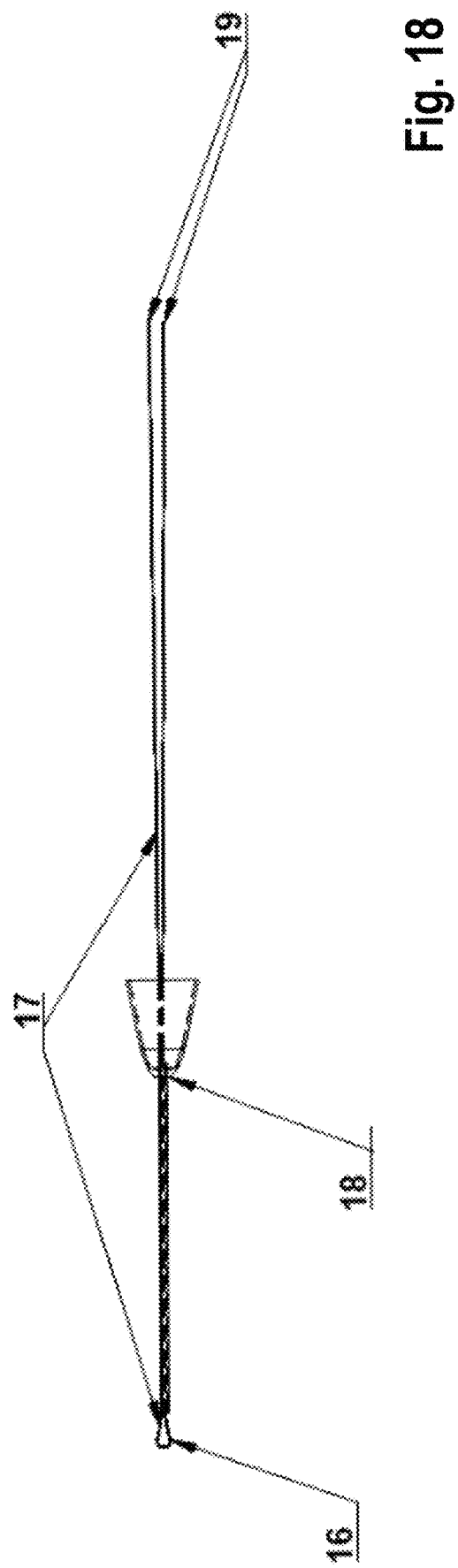
FIG. 18 shows a loop arrangement for the instrument.
Figure 19:
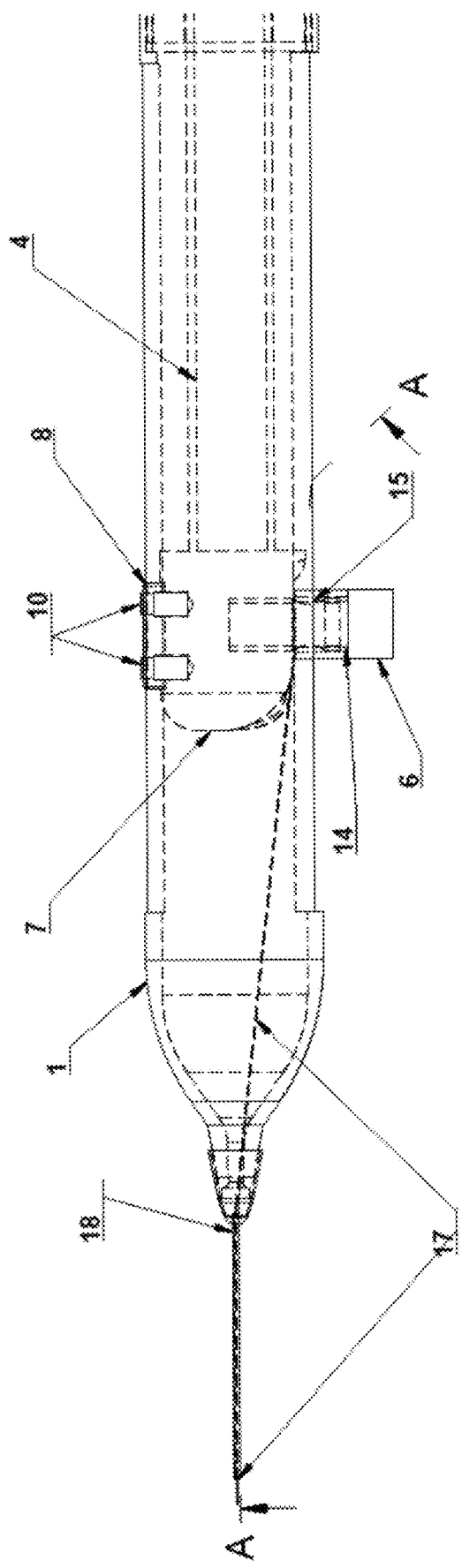
FIG. 19 shows the front part of the instrument with the loop arrangement attached thereto, with a wire 17 clamped between the slide 7 and the locking nut 6.
Figure 20:
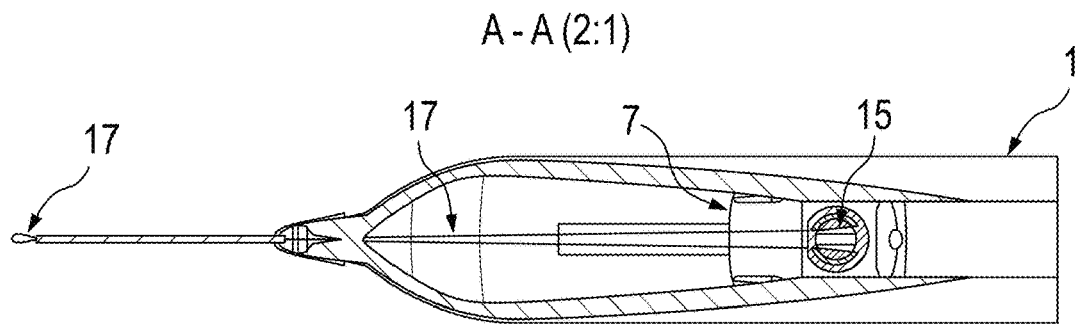
FIG. 20 shows the arrangement of FIG. 19 turned by 90°.

Design and Function of an Instrument According to the Invention:

FIG. 1, FIG. 2, FIG. 3 and FIG. 4 show perspective views of an instrument according to the invention with a loop attachment (FIG. 18).

Figure 6:
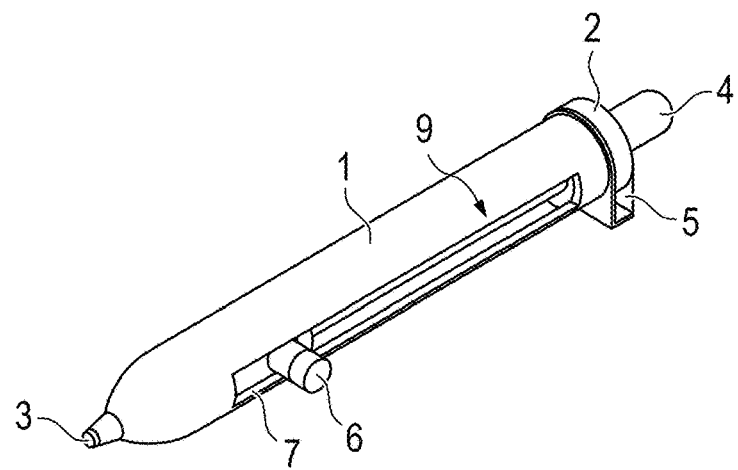
FIG. 6 shows a perspective view of the instrument without the loop arrangement.
Figure 7:
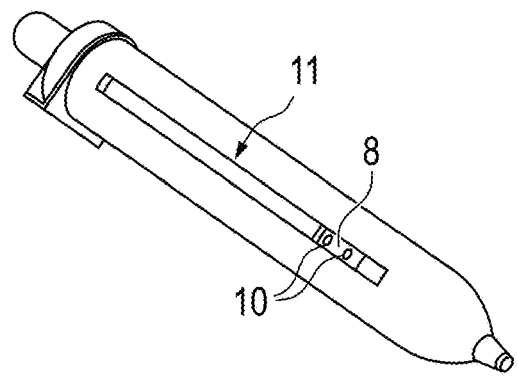
FIG. 7 shows the instrument from FIG. 6 from the opposite site.
Figure 8:
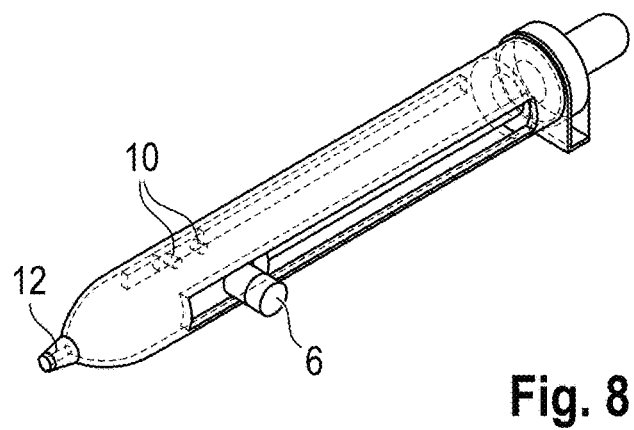
FIG. 8 shows the embodiment of FIG. 6 and partly the inside arrangement in dotted lines.
Figure 9:
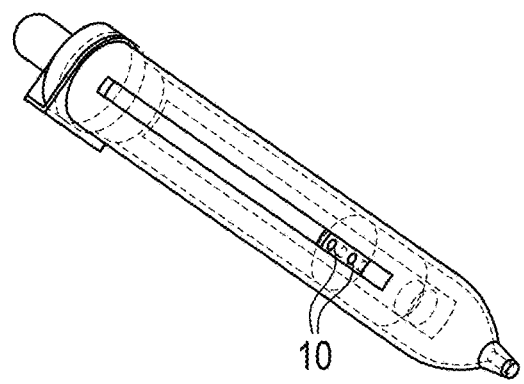
FIG. 9 shows the arrangement from FIG. 7, wherein parts not viewable from outside are indicated in dashed lines.
Figure 10:
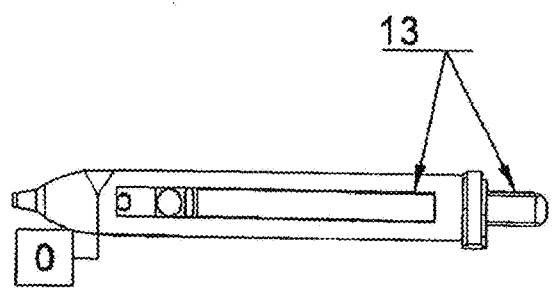
FIG. 10 shows the arrangement of FIG. 6 in a side view.
Figure 11:
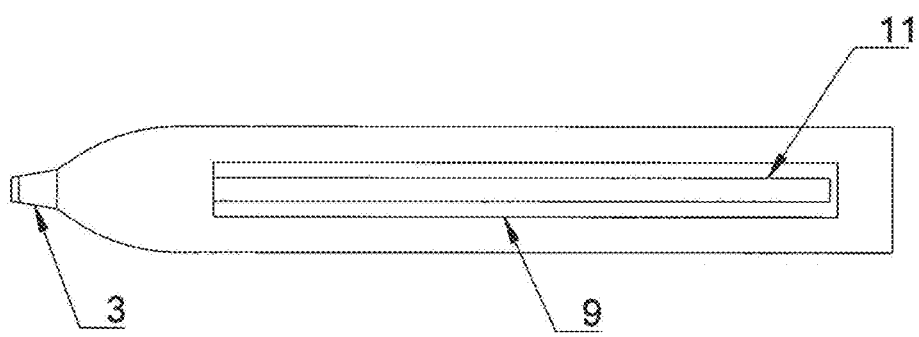
FIG. 11 shows the housing of the arrangement.
Figure 12:
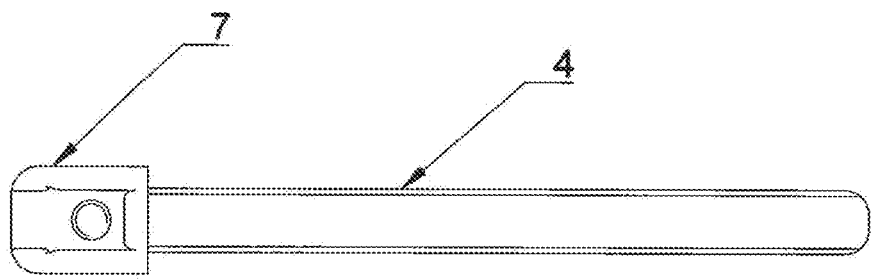
FIG. 12 shows the threaded rod with the slide of the arrangement.
Figure 13:
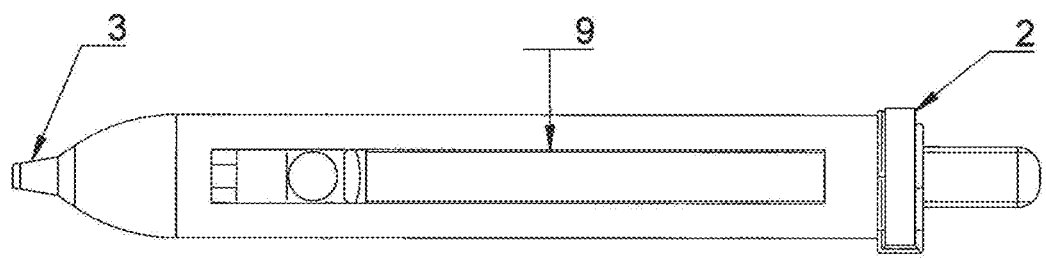
FIG. 13 shows the same arrangement as FIG. 10.
Figure 14:
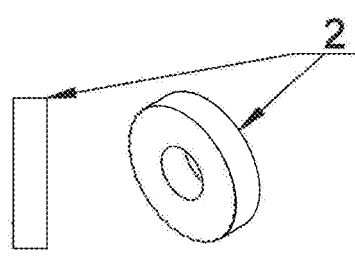
FIG. 14a shows the adjusting wheel of the arrangement in perspective.
FIG. 14b shows the adjusting wheel in side elevation.
Figure 15:
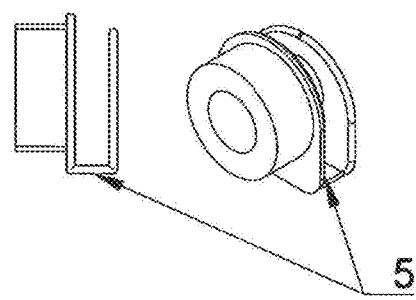
FIG. 15a shows the bearing for the adjusting wheel of the arrangement in perspective.
FIG. 15b shows the adjusting wheel in side elevation.
Figure 29:
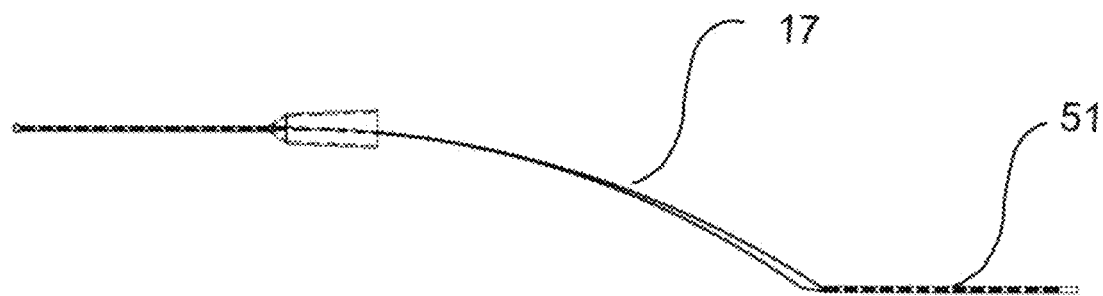
FIGS. 29 and 30 show a needle arrangement in front view (FIG. 30) and a sectioned view.
Figure 30:
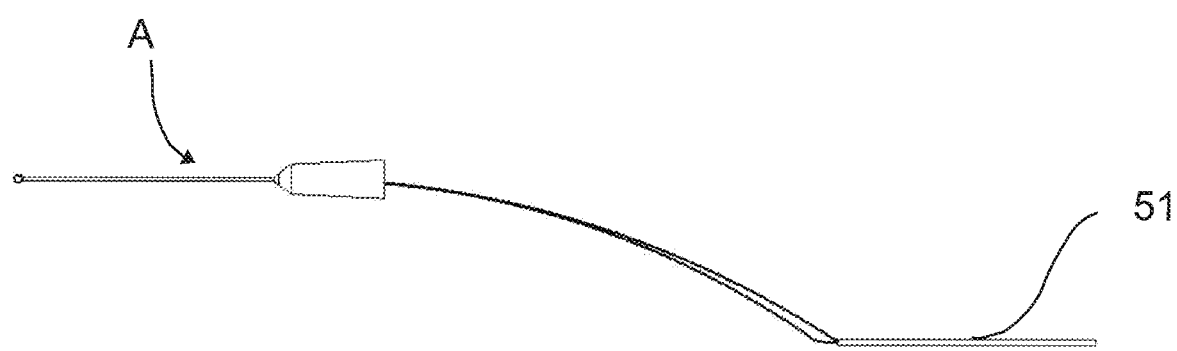

The attachment (FIG. 18) consists of a very thin wire 17 with a diameter of usually 0.06 mm-0.15 mm, preferably made of stainless steel, which is passed with both ends 19 through a suitable cannula (0.3 mm-1 mm depending on the wire). This creates a very small loop 16 at the tip of the cannula. The cannula 18 can be bent as required to provide good access to the root canal. When placing the attachment (FIG. 18) on the instrument tip 3 (FIG. 6) of instrument 0, the two wire ends 19 are guided through a hole 12 (FIG. 8) and then inserted through a through-hole 15 (FIG. 16) of a fixing screw (or threaded bolt) 14. The wire 17 is tensioned slightly, so that the loop contracts slightly, and then fixed with the locking nut 6. Now the loop can be adjusted to the desired size by turning the adjusting wheel 2 (FIG. 6) and closed if necessary. To facilitate the threading of the wire 17, the wire ends can also be attached to a needle or pin-type guide rod 50, which can easily be pushed through the hole 12 of the instrument tip 3 and the through-hole 15 of the fixing screw 14 (see FIGS. 29 and 30).

Instrument 0 has an instrument housing or a housing body 1, which has an elongated windowing 9 and 11 on each side. The windowing 11 serves as a rail and rotation protection and is referred to as rail 11 in the following. Windowing 9 is used for operation, access and fastening of the wire. In the following it will be called windowing 9. In the housing body 1, a very precisely fitting slide 7 runs which is firmly connected with a threaded rod 4. At the side of the slide 7 there is the fixing screw 14 with the through-hole 15 extending in an axial direction, and the appropriate locking nut 6 for fixing the wire 17. This part can be operated through the windowing 9. The slide 7 is flattened on this side to avoid a too inclined pulling direction of the wire 17 by a fastening point that is too far of the pulling axis. Furthermore, the front side of the slide 7 is in particular rounded on this side in order to avoid loading of the wire 17 over an edge. On the opposite side of the slide 7, a guide block 8 with two grub screws 10 is attached, which is guided in the rail 11 of the housing body 1 and thus prevents the rotation of the slide 7.

Figure 28:
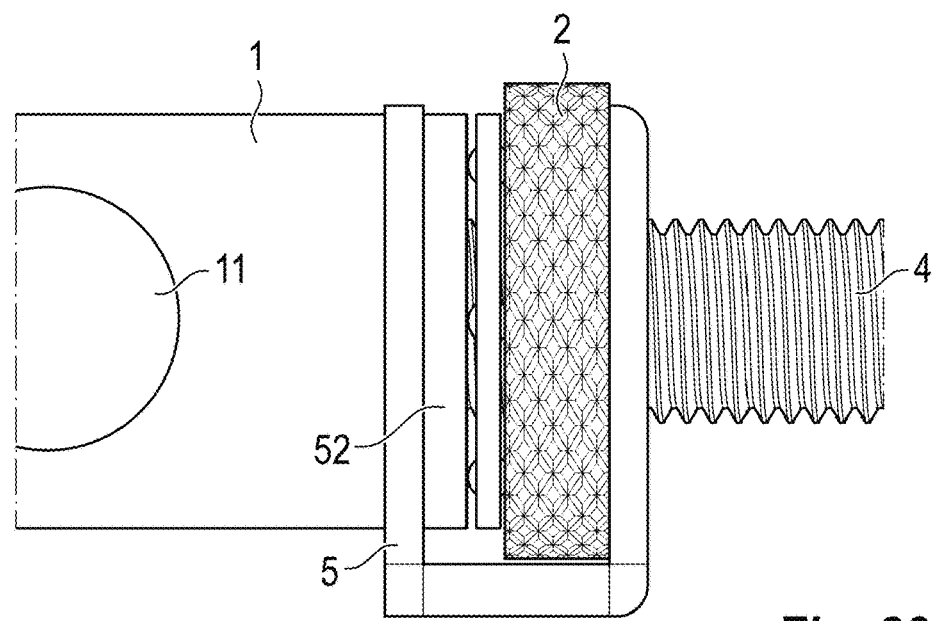
FIG. 28 shows an alternative embodiment of the adjusting wheel 2 with a roller bearing.

At the rear end of the housing body 1 there is an adjusting wheel 2 with an internal thread. This adjusting wheel is located in an adjusting wheel bearing 5 and guides the threaded rod. The adjusting wheel bearing 5 is screwed into the housing body 1 from behind. By turning the adjusting wheel 2, the threaded rod 4 and thus the slide 7 can be moved back and forth. This allows the loop to be tightened or loosened with the help of the adjusting wheel 2. The adjusting wheel 2 can be supported axially against the adjusting wheel bearing 5 or the adjusting wheel holder by a sliding bearing or a roller bearing 52 as shown in FIG. 28.

In practice, after the wire 17 has been clamped in, the loop 16 is adjusted to the desired size by the physician using the adjusting wheel 2 so that the loop 16 can be placed around the fractured instrument to be removed. Then, on the physician's order, the assistant turns the adjusting wheel 2 clockwise to close loop 16 without the physician having to remove his concentration from the placement of the loop or risking shaking by his own hand movements.

Figure 21:
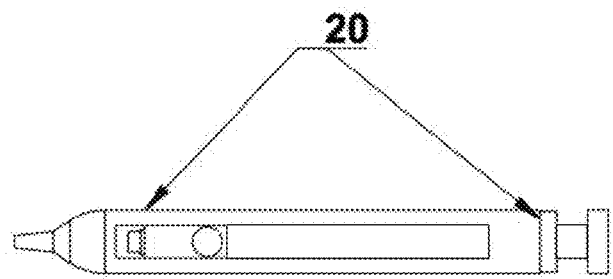
FIGS. 21 to 23 show variants of the instrument in front view, rear view and perspective view.
Figure 22:
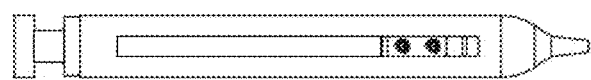
Figure 23:
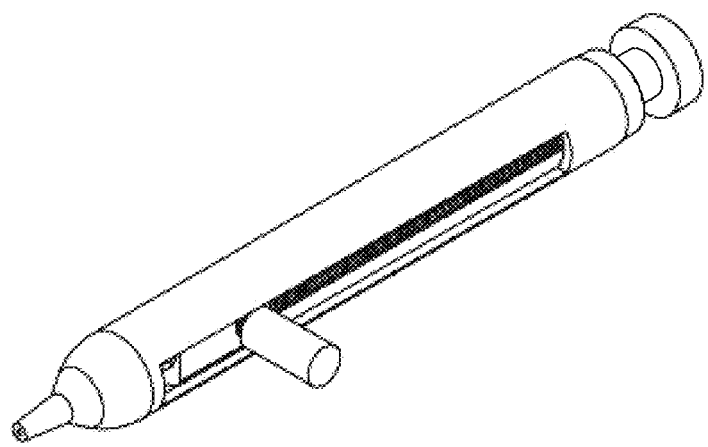
Figure 24:
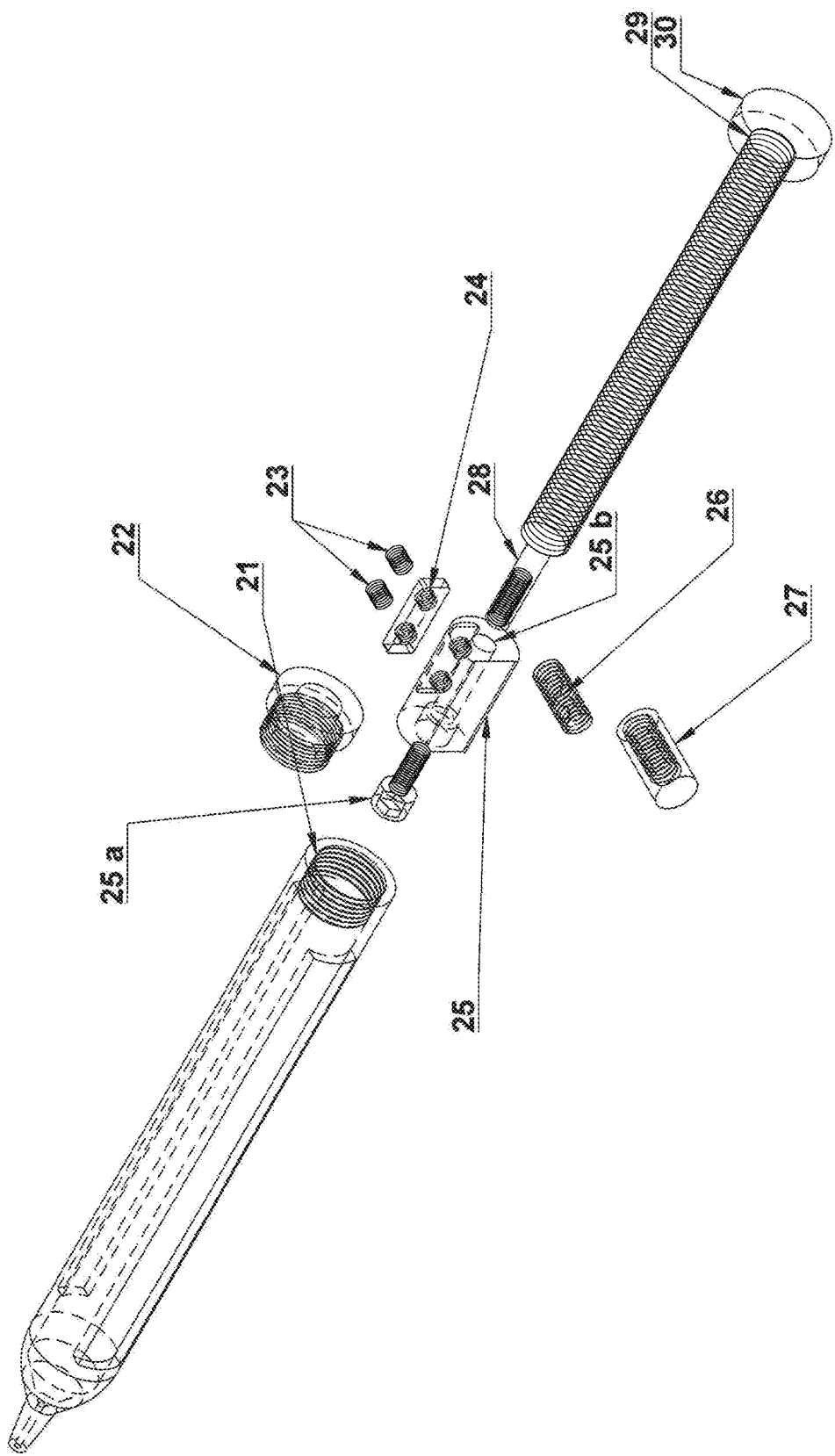
FIG. 24 shows the instrument of FIG. 21 in exploded view.
Figure 25:
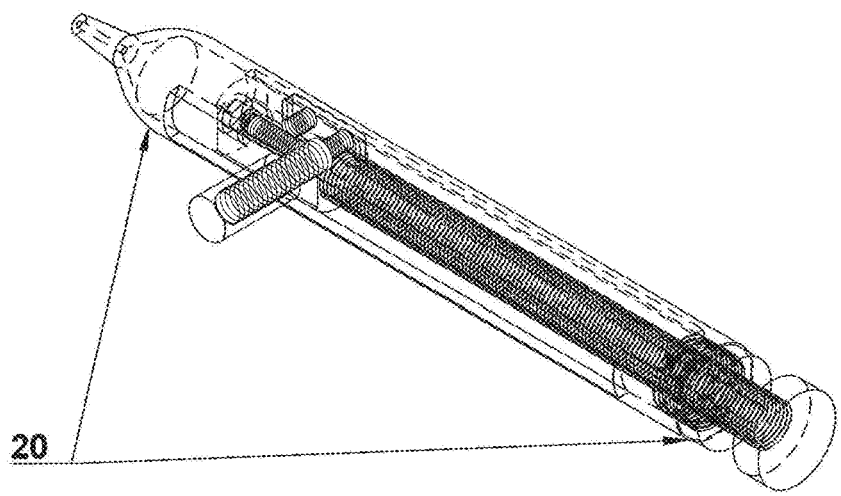
FIG. 25 shows the arrangement of FIG. 21 in a perspective view, wherein the inner parts of the instrument are indicated as dashed lines.

An alternative embodiment of an instrument according to the invention is shown in FIG. 21, FIG. 22, FIG. 23, FIG. 24 and FIG. 25. The drawings FIG. 21, FIG. 22 and FIG. 23 show the instrument 20 in different perspective views. FIG. 24 shows an exploded view of the instrument.

In this variant of the instrument 20 according to the invention, there is no rigid connection between the threaded rod 29 and the slide 25, but they are connected to each other via a joint. The threaded rod 29 is connected via the shaft 28, which is supported in the bore 25b, with a rotation degree of freedom to the slide 25, which is protected against rotation by the guide block 23. The shaft 28 is fixed with a counter screw 25a. The threaded rod 29 is guided by a guide nut 22 attached to the rear housing body 21. By turning the adjusting wheel 30 rigidly connected to the threaded rod 29, the slide 25 can be moved back and forth. The other functions and design of the alternative instrument variant 20 corresponds as far as possible to instrument 0 according to the invention.

Figure 26:
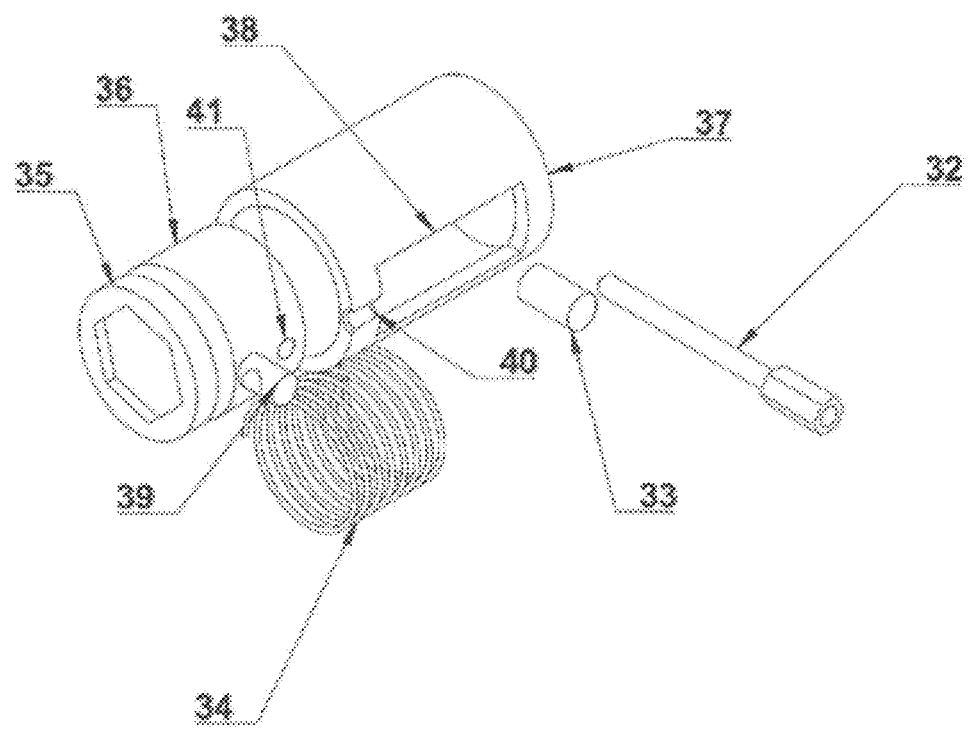
FIG. 26 shows an alternative arrangement for a slide in exploded view.
Figure 27:
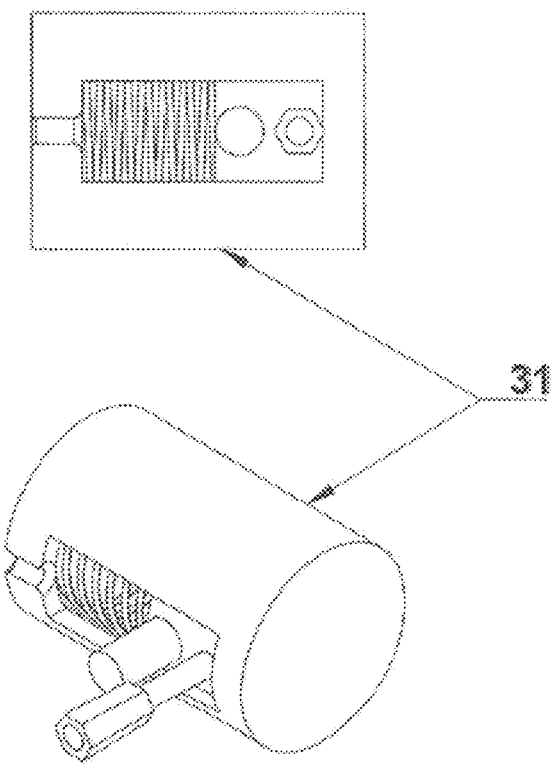
FIG. 27a shows the variant of slide 7 in front view.
FIG. 27b shows the variant of slide 7 in perspective.

FIGS. 26 and 27 show an alternative variant of slide 7 and 25. This slide 31, hereinafter referred to as the tension measuring slide 31, offers the possibility of measuring the tensile force acting on the wire. This can be a good orientation aid for the inexperienced operator when tensioning the loop, in particular at the beginning.

The tension measuring slide 21 consists of a housing body 37 in which a piston 36 is guided. A spring 34 is located in front of the piston 36. The housing body 37 is closed by a screw plug 35. At the side of the piston 36, there is the fastening screw 39 and the fastening nut 33 for clamping the wire 17. Directly behind it, there is a threaded hole 41 through the entire piston 36. A locking screw 32 is screwed through this threaded hole 41, with which the piston 36 can be locked in the housing body 37 if required. The housing body 37 has a lateral windowing 38.

If tension is applied to the wire by pulling back the tension measuring slide in an instrument 0 or 20 according to the invention, the piston 36 moves forward in the housing buddy 37 in accordance with the tension force and tensions the spring 34. Tension force can now be read off a scale on the housing body 37.

I claim:

1. An instrument (0) for removing fractured root canal instruments, comprising:
   an instrument housing (1) formed hollow at least at a front end portion thereof;
   a slide (7) non-rotatably held on the instrument housing (1) and guided for translational movement in an axial direction;
   a threaded rod (4) fixed to the slide (7) and engaged with a counter thread of the instrument housing (1) or a counter member held on the instrument housing (1), so that a relative rotational movement between the threaded rod (4) on the one hand and the instrument housing (1) and/or the counter member on the other hand results in an axial displacement of the slide (7);
   a wire (17) clamped by the slide (7) within the instrument housing (1); and
   a fastener fastening the wire (17) to the slide (7);
   the hollow instrument housing (1) is open towards a front side thereof, so that the wire (17) is guidable through the open front side into the instrument housing (1) and therein to the fastener;
   the instrument housing (1) having a windowing (9) laterally so that the wire (17) inserted into the instrument housing (1) through the open front side is guidable outwardly through the windowing (9) again and brought into engagement with the fastener;
   the fastener connected to the slide (7) through the windowing (9) of the instrument housing (1) and projecting from the instrument housing (1) so that the fastener with the slide (7) being actuatable from an outside of the instrument housing (1);
   the fastener comprises a threaded bolt (14) inserted into the slide (7) through the windowing (9) and fixed therein, and a locking nut (6) screwed onto an end of the threaded bolt (14) projecting from the slide (7) so that the wire (17) is clampable between the locking nut (6) and the slide (7) to fix the wire (17) to the slide (7);
   wherein a through-hole (15) is formed in the axial direction in the threaded bolt (14) through which the wire (17) is passable, or wherein an annular circumferential groove extending over several turns of a thread of the threaded bolt (14) is formed in a circumferential surface of the threaded bolt (14) for receiving the wire (17) to be fixed to the slide (7).

2. The instrument (0) for removing fractured root canal instruments according to claim 1, wherein the instrument housing (1) is tubular and wherein the slide (7) is non-rotatably held in the instrument housing (1) but is guided for translational movement in the axial direction.

3. The instrument (0) for removing fractured root canal instruments according to claim 1, wherein the front end portion of the instrument housing (1) is designed on the outside as an instrument tip (3) in such a way that an attachment in the form of a cannula (18) can be plugged onto the instrument tip (3) and fixed thereto in a clamping manner, for which purpose the instrument tip (3) has a corresponding conicity on the outside, wherein a bore (12) open towards the front of the instrument housing (1) is formed in the instrument tip (3) for the passage of the wire (17).

4. The instrument (0) for removing fractured root canal instruments according to claim 1, wherein the threaded rod (4) is provided with a fine thread having a pitch of 0.2 to 1.2 mm.

5. The instrument (0) for removing fractured root canal instruments according to claim 1, wherein the instrument housing (1) is tubular and the slide (7) is non-rotatably held in the instrument housing (1) and is guided for translational movement in the axial direction.

6. The instrument (0) for removing fractured root canal instruments according to claim 2, wherein the fastener is connected to the slide (7) through the windowing (9) of the instrument housing (1) and projects from the instrument housing (1) so that the fastener with the slide (7) being actuatable from an outside of the instrument housing (1).

7. An instrument (0) for removing fractured root canal instruments, comprising:
   an instrument housing (1) formed hollow at least at a front end portion thereof;
   a slide (7) non-rotatably held on the instrument housing (1) and guided for translational movement in an axial direction;
   a threaded rod (4) fixed to the slide (7) and engaged with a counter thread of the instrument housing (1) or a counter member held on the instrument housing (1), so that a relative rotational movement between the threaded rod (4) on the one hand and the instrument housing (1) and/or the counter member on the other hand results in an axial displacement of the slide (7);
   a wire (17) clamped by the slide (7) within the instrument housing (1);
   a fastener for fastening the wire (17) to the slide (7), wherein the hollow instrument housing (1) is open towards a front side thereof, so that the wire (17) being guidable through the open front side into the instrument housing (1) and therein to the fastener; and
   an adjusting wheel (2);
   the threaded rod (4) is connected to the slide (7) in a rotationally fixed manner and engages axially into the instrument housing (1) from a rear side thereof,
   the adjusting wheel (2) is screwed onto an external thread of the threaded rod (4),
   the adjusting wheel (2) being held axially fixed to the instrument housing (1) so that a rotation of the adjusting wheel (2) is converted into an axial movement of the threaded rod (4) and thus of the slide (7).

8. The instrument (0) for removing fractured root canal instruments according to claim 7, wherein a holder is attached to the rear side of the instrument housing (1), wherein the threaded rod (4) passes axially through the holder, and wherein the adjusting wheel (2) is positioned axially fixed to the holder.

9. The instrument (0) for removing fractured root canal instruments according to claim 8, wherein the adjusting wheel (2) is axially supported on the holder by a sliding or roller bearing.

10. The instrument (0) for removing fractured root canal instruments according to claim 7, wherein the instrument housing (1) is tubular, and wherein the slide (7) is non-rotatably held in the instrument housing (1) but is guided for translational movement in the axial direction.

11. The instrument (0) for removing fractured root canal instruments according to claim 7, wherein the threaded rod (4) is provided with a fine thread having a pitch of 0.2 to 1.2 mm.

\* \* \* \* \*